United States Patent
Morgan

[11] Patent Number: 5,902,377
[45] Date of Patent: May 11, 1999

[54] MIXING APPARATUS FOR GAS SCRUBBING SYSTEMS

[76] Inventor: Vernon E. Morgan, 7607 Glenshannon Cir., Dallas, Tex. 75225

[21] Appl. No.: 08/880,116

[22] Filed: Jun. 21, 1997

Related U.S. Application Data

[63] Continuation-in-part of application No. 08/585,571, Jan. 16, 1996, abandoned.

[51] Int. Cl.[6] .................................................. B01F 3/04
[52] U.S. Cl. ............................ 95/218; 95/227; 96/282; 96/283; 96/327; 96/332; 261/90; 261/92
[58] Field of Search ........................... 95/151, 218, 227; 96/282, 283, 327, 332, FOR 121, FOR 122; 261/90, 92

[56] References Cited

U.S. PATENT DOCUMENTS

| | | | |
|---|---|---|---|
| 772,655 | 10/1904 | Fries | 261/90 |
| 775,462 | 11/1904 | Steinbart | 261/90 |
| 775,758 | 11/1904 | Matton | 261/90 |
| 777,112 | 12/1904 | Kratochvil | 261/90 |
| 845,460 | 2/1907 | Gore | 261/90 |
| 859,427 | 7/1907 | Brandenburg | 95/218 |
| 1,005,819 | 10/1911 | Ensign | 261/90 |
| 1,088,188 | 2/1914 | Theisen | 261/90 |
| 1,184,261 | 5/1916 | Rateau | 261/90 |
| 1,390,183 | 9/1921 | Wells | 261/90 |
| 1,727,152 | 9/1929 | Winkler | 261/90 |
| 2,159,400 | 5/1939 | Preston | 261/90 |
| 3,053,615 | 9/1962 | Steinert | 261/90 |

FOREIGN PATENT DOCUMENTS

| | | | |
|---|---|---|---|
| 60198 | 3/1913 | Australia | 261/90 |
| 175246 | 6/1953 | Australia | 261/90 |
| 581119 | 11/1924 | France | 96/FOR 122 |
| 711127 | 9/1931 | France | 96/FOR 121 |
| 2308440 | 8/1974 | Germany | 261/90 |
| 59-150519 | 8/1984 | Japan | 96/FOR 121 |

*Primary Examiner*—C. Scott Bushey
*Attorney, Agent, or Firm*—Jack A. Kanz

[57] ABSTRACT

Gases containing solubles or suspended particles are mixed with a scrubbing liquid in a mixing apparatus having a chamber with a rotatable wheel mounted therein. The gas is mixed with a scrubbing liquid by the rotating wheel which has first and second scrubbing surfaces including vanes for creating turbulence and moving the gas through the chamber. The vanes on the first scrubbing surface increase in height from the axis of the wheel to its periphery to move gas radially outwardly. The vanes on the second scrubbing surface increase in height from the periphery to the axis of the wheel to move the gas radially inwardly.

12 Claims, 4 Drawing Sheets

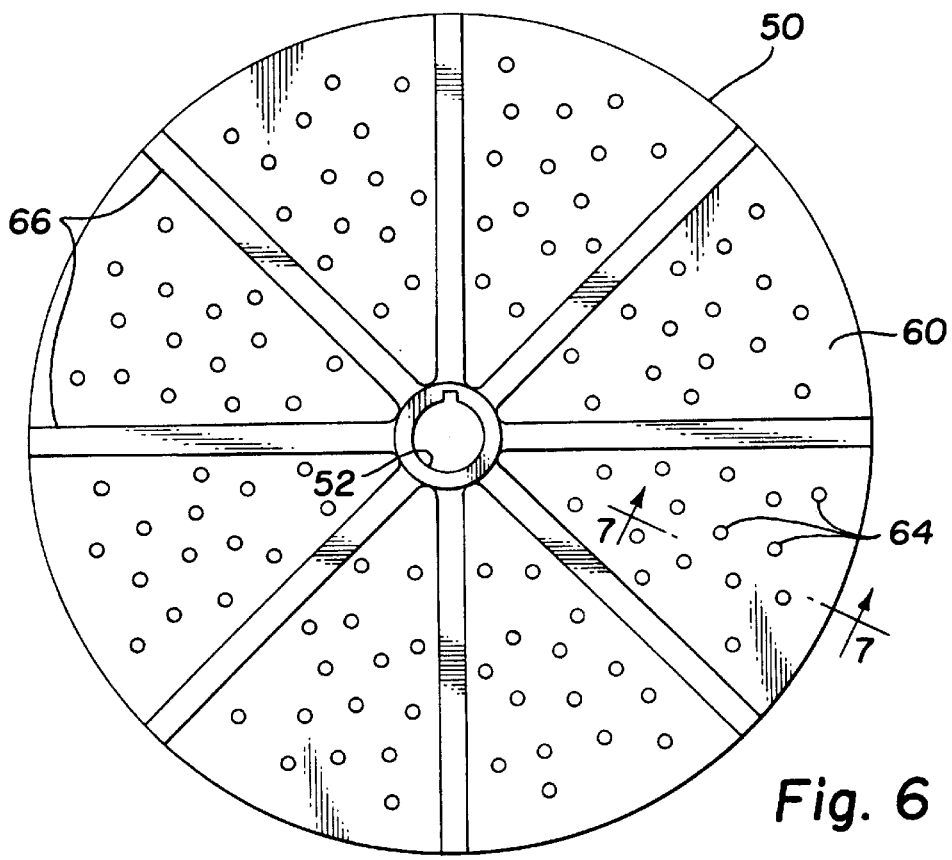
Fig. 6
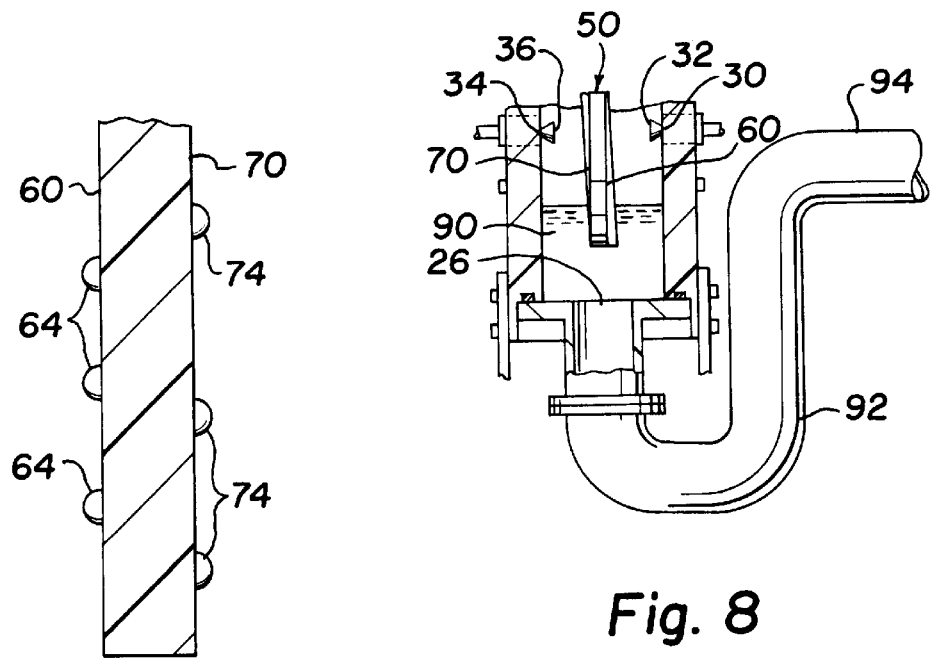
Fig. 7
Fig. 8

MIXING APPARATUS FOR GAS SCRUBBING SYSTEMS

This is a continuation-in-part of application Ser. No. 08/585,571 filed Jan. 12, 1996 (although the Official filing date is recorded as Jan. 16, 1996 because of "snow days") entitled Gas Scrubber, now abandoned.

This invention relates to methods and apparatus for removing solubles and suspended particles from gases. More particularly, it relates to moving surfaces of a rotatable wheel wetted by a scrubbing liquid through a gas to thoroughly mix the gas and scrubbing liquid so that contaminants in the gas are transferred to the scrubbing liquid. The scrubbing liquid is then withdrawn from the system. The entire scrubbing process can be performed on a stream of flowing gas without appreciably affecting the flow rate or pressure in the gas system.

BACKGROUND OF THE INVENTION

This invention provides systems for general mass transfer of solubles and suspended particles from a gas to a liquid. Such systems are applicable to any industrial process which produces gases carrying soluble or partially soluble gases or wettable or soluble solids which must be scrubbed from the gas. For example, vapor deposition and etching processes such as those employed in the semiconductor industry produce gases which are laden with solubles including hydrochloric acid, hydrofluoric acid, nitric acid, ammonia, metal halides and other halogen compounds. These gases must be scrubbed free of such contaminants before venting to the environment or captured for other uses or reuse.

Conventional gas scrubbers generally employ filter media such as packed beds or mixing apparatus such as rotatable cylinders for scrubbing solubles or suspended particles from the gas. U.S. Pat. No. 4,762,539 discloses such a scrubber wherein one or more rotatable cylinders having perforations for passage of smoke are partially immersed in a liquid bath contained in a scrubbing chamber. The cylinders include cups along their axes for spilling liquid over the cylinders during rotation. Smoke laden with particulate impurities is propelled through the perforations as the cylinders rotate. The cups collect and spill liquid from the bath over the cylinders as smoke is forced through the perforations of all of the cylinders to the interior of the innermost cylinder and from there through the perforations to the outermost cylinder, whereby the gas is washed free of particulate impurities.

Another scrubber for removing solubles from gas is disclosed in U.S. Pat. No. 5,011,520 wherein a stream of gas passes from a negative pressure stage (where it is sprayed by a scrubbing liquid) through a constricted region of the scrubber into a main scrubbing chamber. In the main chamber the gas effluent is again sprayed with scrubbing liquid in an upper region of the chamber. The gas and scrubbing liquid move to a central region of the chamber where a media filters and mixes the gas and scrubbing liquid. A lower separation region of the chamber separates and discharges the scrubbed gas. The scrubbing liquid laden with contaminants removed from the gas moves through a diverter plate at the lower boundary of the separation region and into a lowermost region of the chamber.

U.S. Pat. No. 5,185,016 discloses a gas scrubber having a rotatable turbine with blades at its periphery and openings along its axis. The turbine is housed within a chamber containing a body of liquid. A stator partially surrounds the rotatable turbine and forms a channel therebetween. The channel communicates with the body of liquid in which the blades of the turbine dip. Waste gas is fed into the rotating turbine along its axis and passes through its openings to the periphery, whereby the gas and liquid from the liquid body mix in a turbulent fashion within the channel.

SUMMARY OF THE INVENTION

In accordance with the present invention, gas mixing and scrubbing apparatus is provided which has a chamber for receiving gas containing solubles and/or suspended particles. A rotatable wheel is housed in the chamber. The wheel has first and second oppositely disposed scrubbing surfaces which are wetted by scrubbing liquid. As the wheel rotates and creates turbulence, the wetted surfaces move through the gas to promote surface contact between the gas phase and the liquid phase for efficient mass transfer of solubles from the gas to the liquid. The rotational velocity of the wheel extends wetted surface contact between gas and liquid to increase the effective residence time (the amount of time the gas resides in the chamber) and increase mass transfer efficiency. The extended wetted surface provided by the present invention advantageously permits use of smaller units with shorter residence times than that of larger units with no corresponding reduction in mass transfer efficiency. More significantly, the system moves gas through the scrubber without imposing a substantial change in pressure or flow rate of gas in the system. Thus, the system of the invention can be installed in gas flow systems and be essentially transparent to the gas system. Other features and advantages of the invention will become more readily understood from the following detailed description taken in connection with the appended claims and attached drawing in which like numerals designate like parts and in which:

BRIEF DESCRIPTION OF THE DRAWING

FIG. 6 is a front face view of an alternative embodiment of the rotatable wheel;

FIG. 7 is a fragmental sectional view of the rotatable wheel of FIG. 6 taken along line 7—7; and FIG. 8 is an elevational view, partially in section, of an alternate arrangement of the fluid collection portion of the apparatus of FIG. 1.

DESCRIPTION OF THE PREFERRED EMBODIMENTS

Figure 1:
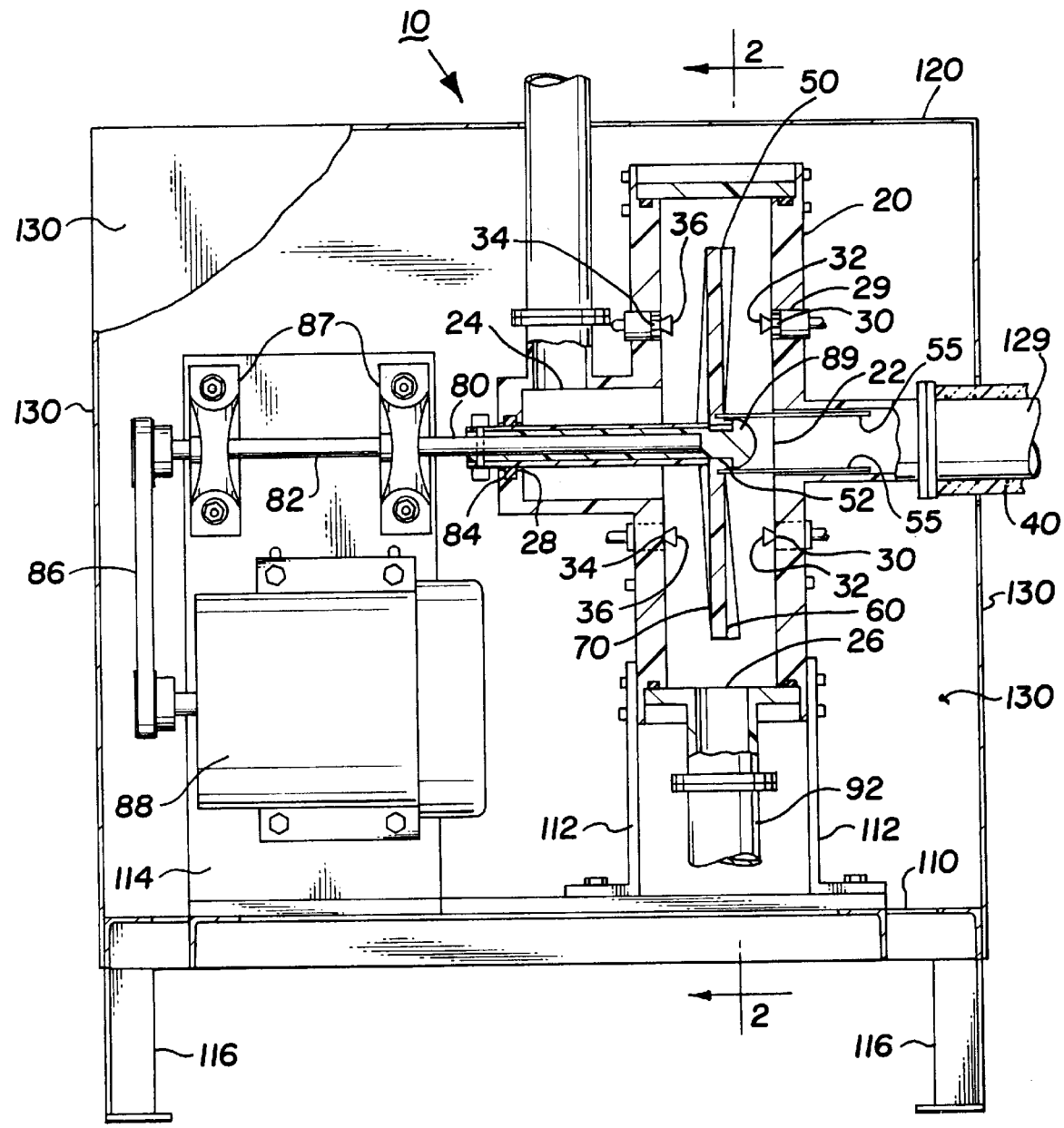
FIG. 1 is an elevational view, partially in section, of apparatus employing the preferred embodiment of the invention.

FIG. 1 illustrates gas scrubber apparatus 10 for removing solubles or suspended particles from gas. The apparatus comprises a chamber 20 having a gas inlet 22 (adapted to receive a tubular member 129 for delivering gas laden with solubles) and a gas outlet 24 (for venting scrubbed gas to the ambient environment or to a gas collection system). A liquid inlet 29 is adapted for delivering scrubbing liquid to chamber 20. A scrubbing liquid outlet 26 for draining the scrubbing liquid laden with solubles and particulates is provided in a lower region of the chamber 20.

A rotatable wheel 50 housed within chamber 20 has a first scrubbing surface 60 and a second oppositely disposed scrubbing surface 70. As wheel 50 rotates and creates turbulence, first scrubbing surface 60 and second scrubbing surface 70 are wetted by scrubbing liquid injected through inlet 29. The wetted surfaces move rapidly through the gas to promote increased surface contact between gas and liquid for efficient mass transfer of solubles and suspended particles from the gas to the scrubbing liquid.

Figure 2:
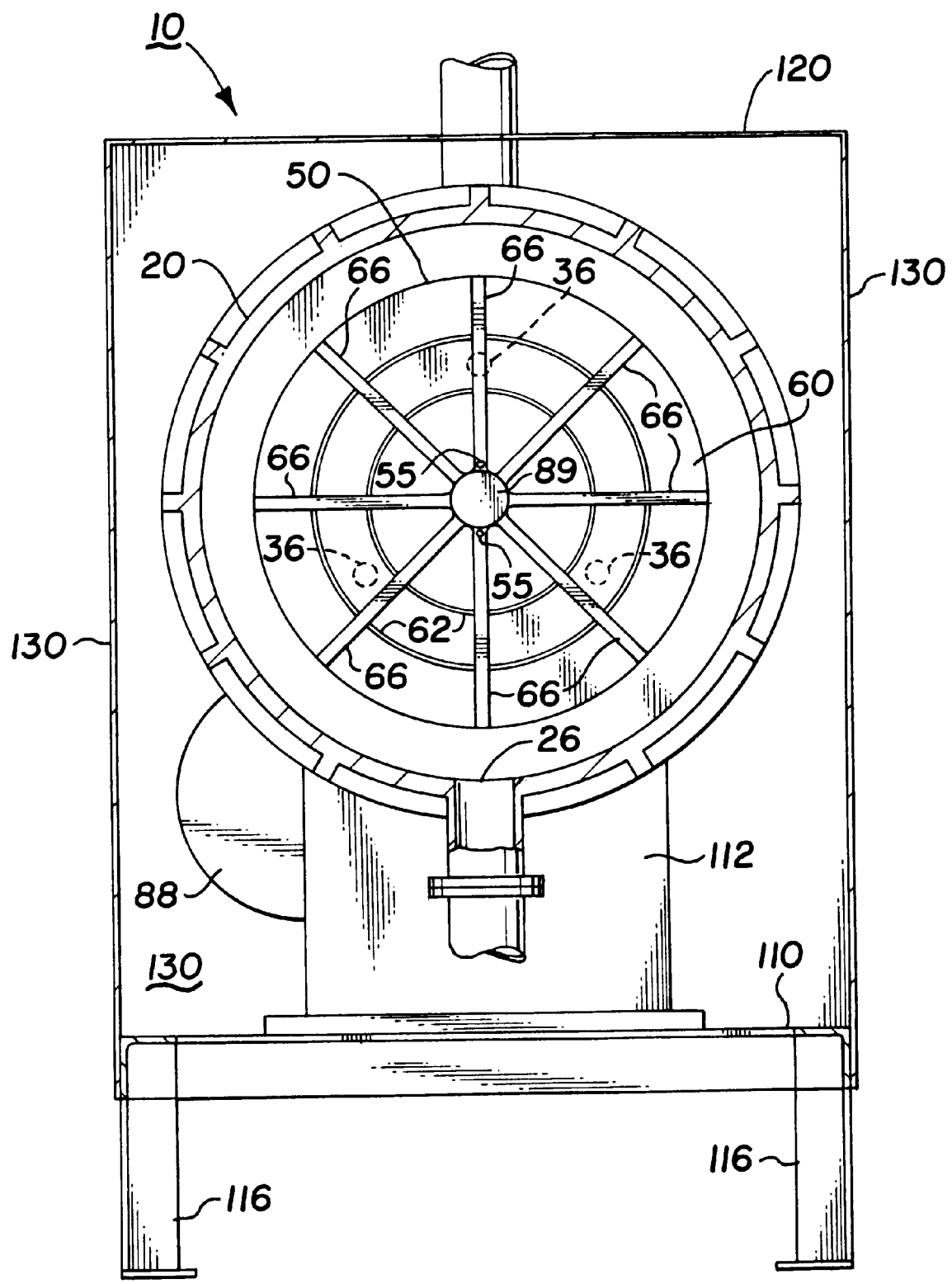
FIG. 2 is a sectional view taken along line 2—2 of FIG. 1.
Figure 5:
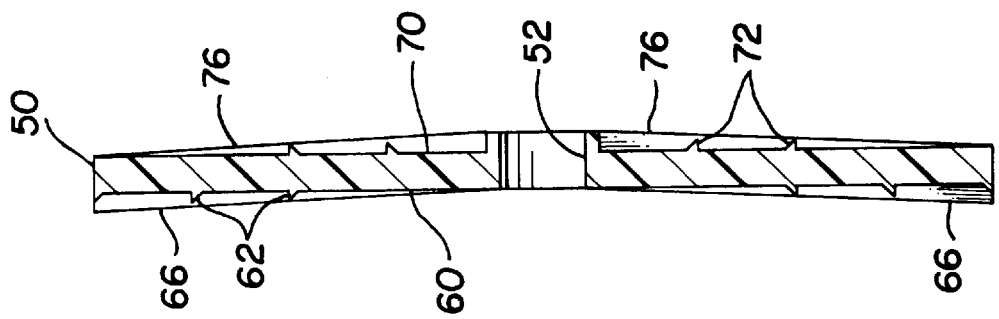
FIG. 5 is a sectional view of the rotatable wheel taken along line 5—5 of FIG. 3.
Figure 4:
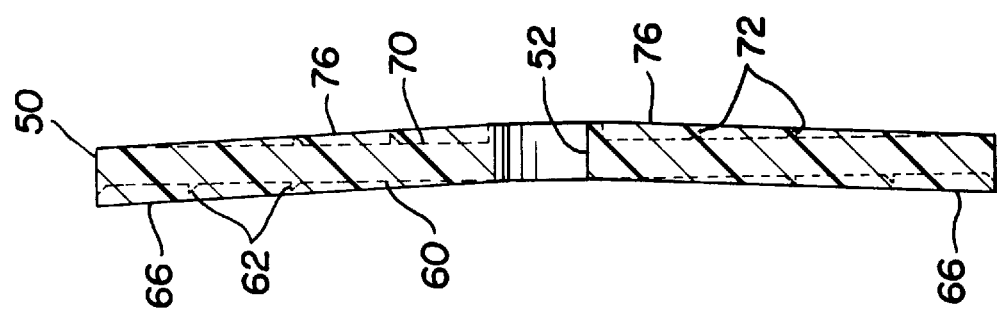
FIG. 4 is a sectional view of the rotatable wheel taken along line 4—4 of FIG. 3.
Figure 3:
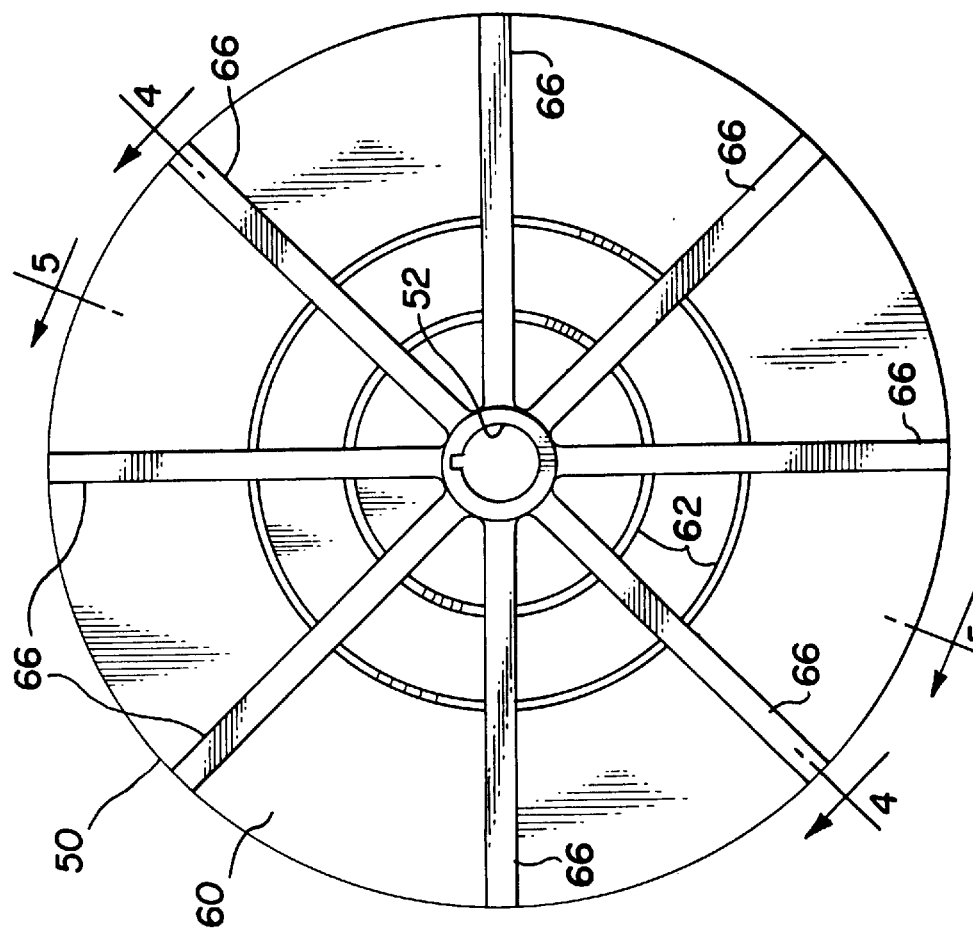
FIG. 3 is a front face view of the rotatable wheel used in the apparatus of FIG. 1.

As seen more clearly in FIGS. 2 and 3, first scrubbing surface 60 comprises a plurality of first scrubbing vanes 66 which extend outwardly from surface 60 and radially outwardly from the axis of rotatable wheel 50 toward the periphery. First scrubbing vanes 66 increase in height as they extend in distance from the axis of the rotatable wheel 50 toward its periphery as shown in FIGS. 4 and 5.

Second scrubbing surface 70 also includes a plurality of vanes 76 which extend radially outwardly from the axis of the rotatable wheel 50. As illustrated in FIGS. 4 and 5, vanes 76 decrease in height as they extend from the axis of the wheel 50 toward its periphery. The vane configurations create turbulence and greatly increase surface contact between the gas and liquid phases to facilitate transfer of solubles and suspended particles from the gas to the scrubbing liquid. Furthermore, the first and second scrubbing vanes 66, 76 provide impetus for moving gas through chamber 20 without the need for a fan, pump or the like for moving the gas and without significantly affecting gas pressure in the gas system in which the scrubber is installed.

In the preferred embodiment shown in FIGS. 2–5, first and second scrubbing surfaces 60, 70 include a plurality of concentric rings 62, 72 which roughen the first and second scrubbing surfaces 60, 70 to increase agitation of gas and scrubber liquid. In the embodiment of FIGS. 6 and 7, first and second scrubbing surfaces 60, 70 employ a plurality of individual projections 64, 74 to provide roughened surfaces. Other configurations are similarly suitable for providing roughened first and second scrubbing surfaces 60, 70 or other surface variations which enhance agitation. For example, roughening of surfaces 60, 70 can be accomplished during manufacture of wheel 50 with patterns made by machining. If wheel 50 is molded, granulated or otherwise roughened mold surfaces may be used. Sandblasting can also be used to roughen scrubbing surfaces 60, 70.

Rotatable wheel 50, first and second scrubbing surfaces 60 and 70, scrubbing vanes 66 and 76 and concentric rings 62 and 72 (and/or individual projections 64 and 74) are preferably monolithic to provide maximum mechanical integrity with minimum potential for failure. Furthermore, all surfaces of gas scrubber 10 which contact the gas and solubles (including rotatable wheel 50, inner walls of chamber 20 and its inlets and outlets) are preferably constructed of polypropylene or other suitable material where resistence to corrosive materials is required. Metal is a suitable material where corrosion is not a concern.

As shown in FIG. 1 rotatable wheel 50 is mounted on shaft 80 which is coupled to a motor-driven pulley assembly 86. Shaft 80 may, of course, be coupled directly to motor 88 or other drive means suitable for rotating the wheel 50 about its axis. Shaft 80 extends through an aperture 52 on the axis of rotatable wheel 50 for attachment to hub 89 and passes through an opening 28 in chamber 20 for coupling to pulley assembly 86. A sheath 82 encases shaft 80 and extends the length of the shaft 80, abutting the second scrubbing surface 70 at one end. Packing gland 84 provides a sealing relationship between the sheath 82 and opening 28 in chamber 20 to prevent leakage from chamber 20. The sheath 82 need not extend through packing gland 84 and may be eliminated if shaft 80 is suitably corrosion-resistant.

As shown in FIG. 1 gas inlet 22 is positioned parallel with shaft 80 to direct incoming gas toward the first scrubbing surface 60 at the axis of rotatable wheel 50. Inlet 29 is preferably a plurality of spray nozzles 32 which distribute incoming scrubbing liquid across the first scrubbing surface 60. In the preferred embodiment inlet 29 comprises at least three first inlet ports 30 positioned opposite first scrubbing surface 60. Inlet ports 30 are preferably positioned at spaced positions about the radial midpoint of the rotatable wheel 50. This inlet port configuration provides uniform distribution of scrubbing liquid across first scrubbing surface 60. Inlet port 29 may include second inlet ports 34 which provide uniform distribution of scrubbing liquid across second scrubbing surface 70. Second inlet ports 34 are preferably also equi-spaced radially at about the radial midpoint of the rotatable wheel 50 opposite scrubbing surface 70 as shown in FIGS. 1, 2 and 8. These configurations of first and second inlet ports 30, 34 facilitate uniform distribution of scrubbing liquid for wetting rotatable wheel 50 across both the first and second scrubbing surfaces 60, 70. Other inlet port configurations are, of course, suitable for adequate distribution of the scrubbing liquid.

To further enhance uniform distribution of scrubbing liquid, spray nozzles 32, 36 are positioned in first and second inlet ports 30, 34, respectively. Preferably, the spray pattern emanating from spray nozzles 32, 36 is conical for even distribution of scrubbing liquid across first and second scrubbing surfaces 60, 70. It is to be understood, however, that other spray patterns may be appropriate for distributing scrubbing liquid within chamber 20 and across scrubbing surfaces 60, 70.

During operation of gas scrubber 10, wheel 50 rotates as gas is delivered through gas inlet 22 into chamber 20 proximate first scrubbing surface 60. Scrubbing liquid is injected into chamber 20 through first and second inlet ports 30, 34 and distributed across first and second scrubbing surfaces 60, 70 by spray nozzles 32, 36. Incoming flow rate for the scrubbing liquid is dependent on size of scrubbing unit, gas being scrubbed, gas flow rate, scrubbing liquid supply constraints and other variables and may be less than five (5) gallons per minute. It is to be understood that flow rates are determined as are appropriate for each particular scrubbing operation.

Rotation of wheel 50 effectively extends surface contact between the gas and wetted scrubbing surfaces to effect transfer of solubles from the gas to the scrubbing liquid. Gas flows substantially radially outwardly along the first scrubbing surface 60 (motivated by the increasing height of the first scrubbing vanes 66) toward the periphery of rotatable wheel 50. Scrubbing liquid distributed across first scrubbing surface 60 by spray nozzles 32 also flows substantially radially outwardly. First scrubbing surface 60, wetted by the scrubbing liquid, moves through the gas as wheel 50 rotates and creates turbulence to increase surface contact between the gas and scrubbing liquid. Rotational movement of wheel 50 and first scrubbing vanes 66 extend the wetted surface contact with the gas for effective mass transfer of solubles from the gas to the scrubbing liquid. Agitation of the gas and scrubbing liquid is enhanced by concentric rings 62 and/or projections 64.

As the partially scrubbed gas flows outwardly along the first scrubbing surface 60, it is forced to flow across the periphery of rotatable wheel 50. However, the scrubbing liquid (as a result of its mass and centrifugal force) moves directly from the edge of rotating wheel 50 to the closest wall of chamber 20, thereby forming a liquid curtain through which the gas must pass to reach the opposite side of wheel 50. Second scrubbing vanes 76 force the gas to flow substantially radially inwardly across second scrubbing surface 70 toward the axis of rotatable wheel 50. Clean scrubbing liquid is injected into chamber 20 by second inlet ports 34 and distributed by spray nozzles 36 across second scrubbing surface 70. The scrubbing liquid and the gas, however, flow counter-currently (in opposite directions) across the second scrubbing surface 70. The gas flows radially inwardly and the scrubbing liquid flows radially outwardly across second scrubbing surface 70. Second scrubbing surface 70, wetted by the clean scrubbing liquid, moves through the gas as the wheel 50 rotates and creates turbulence. Rotational movement of wheel 50 and second scrubbing vanes 76 extends wetted surface contact between the gas and liquid phases for efficient mass transfer of solubles. Concentric rings 72 (and/or projections 74) roughen the second scrubbing surface 70 to enhance agitation and increase mass transfer of residual solubles from the gas to the scrubbing liquid.

The scrubbed gas flows to gas outlet 24 for venting to ambient, disposal or other use. The scrubbing liquid (laden with solubles and suspended particles removed from the gas) drains through outlet 26 to drainage pipe 92. The drainage flow rate of scrubbing liquid preferably matches the incoming flow rate so that relatively no accumulation of scrubbing liquid occurs in chamber 20. In the arrangement shown in FIG. 8, a reservoir 90 of scrubbing liquid (through which the periphery of the rotatable wheel 50 moves to aid in generating a curtain of scrubbing liquid at the periphery of rotatable wheel 50) is formed by a barometric leg 94 in drainage pipe 92. The curtain of scrubbing liquid further increases extended surface contact between scrubbing liquid and gas. The barometric leg 94 can be positioned as desired to determine the surface level of reservoir 90.

As shown in FIGS. 1 and 2, chamber 20 is preferably cylindrical to prevent accumulation of gas or scrubbing liquid in static or dead spaces where relatively little turbulence or agitation occurs. The dimensions of chamber 20 should be suitable to provide a minimum residence time for effective mass transfer of solubles from gas to scrubbing liquid. The extended wetted surface provided by the invention advantageously permits use of a small chamber 20 (which may have a small actual residence time) without a corresponding reduction in mass transfer efficiency. Furthermore, smaller chambers 20 permit less accumulation of gas and scrubbing liquid in static spaces. The inner walls of chamber 20 are preferably roughened by sand blasting or other suitable methods to further extend surface contact between gas and scrubbing liquid.

A support structure is illustrated in FIG. 1 for enclosing and mounting gas scrubber 10 and its associated drive means. The support structure preferably comprises a removable bottom plate 110, top plate 120 and side plates 130. Bottom plate 110 secures chamber 20, motor 86 and shaft 80 against significant movement while scrubber 10 is in operation. Chamber 20 is mounted on support panels 112 attached to bottom plate 110 to secure chamber 20 against movement while gas scrubber 10 is in operation. Motor 88 and a plurality of bearings 87 for supporting shaft 80 in alignment with the axis of rotatable wheel 50 are secured to a vertical plate 114 mounted on bottom plate 110. Other configurations for enclosing and mounting the apparatus may be employed as desired.

The support structure illustrated advantageously permits nesting and stacking of multiple units of scrubber 10. A plurality of legs 116 integral with bottom plate 110 provide clearance for the scrubbing liquid drainage line and gas exhaust for stacked configurations. Legs 116 of an upper gas scrubber 10 provide clearance for venting the scrubbed gas from an adjacent lower gas scrubber 10. A suitable nesting configuration comprises four scrubbers, the combination of two side plates of each scrubber 10 forming the perimeter of a rectangle. Side wall 130 supporting gas inlet 22 and the adjacent side wall proximate the motor mount side of vertical plate 114 can form the perimeter of the nesting rectangle to provide easy access to the gas scrubber 10 and drive means for servicing, maintenance and repair.

The invention finds particular applicability and utility in the semiconductor industry where the gas exhaust of multiple vapor deposition units, etching stations and the like are fed into a central or main collection system of conduits for collection and/or disposal and/or reuse. Such systems routinely collect gases containing gaseous ammonia, metal halides, other halogen compounds and acids such as hydrochloric, hydrofluoric and nitric, etc. Because of the corrosiveness and toxicity of such gases, they must be carefully collected, transported and neutralized or stored. To protect personnel and equipment, the exhausts of a plurality of such units are generally fed into a central collection conduit in which the internal pressure is maintained near or below atmospheric. The collection system generally conducts all such collected gases to a central scrubbing station. Large central scrubbing stations, however, are expensive to operate and maintain and are not generally highly effective. Furthermore, malfunction of the central scrubbing station may require shut-down of the entire manufacturing facility.

Apparatus employing the principles of the invention may be designed and fabricated in relatively miniature form. An individual miniature device may thus be positioned in the gas collection system between each contaminated gas generator (such as a vapor deposition unit, an etching station, etc.) to scrub the exhaust gas before it enters the central collection system. Since smaller units are generally more effective than larger units, cleaner exhaust gases are produced. Furthermore, a plurality of such small units may be staged (placed in series) so that the exhaust of one is fed into the inlet of another to create a highly effective and reliable scrubbing system. Most importantly, when each contaminated gas generating unit is equipped with its own exhaust gas scrubber, failure of the gas scrubber requires shut-down of only a single unit. Furthermore, the scrubber for each unit may be customized to treat the effluent peculiar to the unit with which it is associated, further enhancing the efficiency of each individual scrubber as well as the whole system. The over-all result of using individual scrubbers for each contaminated gas generator unit is cleaner exhaust gas produced much less expensively than that produced by a large central scrubber. However, in order to scrub the gas at each unit, the scrubber must be pressure and flow transparent to the collection system. This means that the scrubber must collect exhaust gas from the gas generating unit, scrub the gas, and then in inject the scrubbed gas into the collection system without appreciably affecting the flow rate or gas pressure in the collection system. The scrubber thus cannot appreciably alter the flow rate or the pressure of the gas passing therethrough.

Since the apparatus of the invention uses a rotating wheel with surface variations to agitate and mix gas and scrubbing liquid, the pressure and flow rate of gas flowing therethrough is virtually unaffected by the mixing and scrubbing operation. However, since the second scrubbing surface 70 (the down-stream side of the wheel 50) forces the scrubbing liquid to flow counter-currently (from the axis toward the periphery) gas flow in the opposite direction must be encouraged by such means as establishing a slight pressure drop across the scrubber or other means which forces the gas to flow counter-currently against the scrubber liquid flow on the down-stream side of the wheel 50. This desired movement of gas is performed in the preferred embodiment by vanes 66,76 which, as described above, increase in height from axis to periphery on the first scrubbing surface and decrease in height from axis to periphery on the opposite scrubbing surface 70. Other means, such as appropriately curved vanes, segmented vanes of various sizes and shapes, or other variations in the surface of the wheel 50 may also be used to cause gas flow in the desired direction without adversely affecting gas flow or pressure in the over-all system.

When individual scrubbing units as described above are used in connection with certain contaminated gas generating units, solids may precipitate and accumulate in the gas inlet 22. This is a particular problem in the semiconductor industry where the exhaust gas to be scrubbed contains silanes and the like which form precipitates when exposed to water. Since the scrubbing liquid in most cases is primarily water, silanes in the exhaust gas tend to form silicon oxides and silicic acid which precipitates as a whitish gelatinous gum. Such precipitates tend to form in bulk only in the region of initial contact between water and exhaust gas. Unfortunately, this is the region of gas inlet 22. If allowed to accumulate, such precipitates can adversely affect flow of gas through the inlet and may even clog the inlet 22. To prevent accumulation of precipitates in or near the inlet 22, an agitator is positioned in the inlet 22. In the preferred embodiment the agitator comprises a pair of small rods 55 extending from the first scrubbing surface 60 of wheel 50 parallel with but offset from the axis of rotation. The rods 55 are preferably offset from the axis of rotation by a distance approximately equal to the radius of inlet 22 and inlet 22 is aligned with the axis of rotation of the wheel 50 as shown in FIG. 1. The rods 55 extend at least into the inlet 22 and may extend further into the tubular member 129. Rotation of wheel 50 thus causes the rods 55 forming the agitator to rotate within inlet 22 to dislodge or prevent accumulation of precipitate in the inlet and adjacent tubular member 129. The agitator may, of course, take other forms. For example, a single rod or more than two rods may be used. Alternatively, the agitator may be single or multiple rods formed in the shape of a corkscrew or other suitable shapes. The agitator may be rigid and aligned to rotate within the inlet 22 without engaging the inner walls or may be sufficiently flexible to permit the agitator to expand by centrifrigal force and scrape the inner walls of the inlet 22 and/or tubular member 129 when the wheel 50 is rotated. Various other arrangements and configurations of the agitator will perform the desired functions and are to be considered within the scope of the invention.

In many instances flow of exhaust gas into the mixing unit through inlet 22 is interrupted. Such interruption may occur, for example, when the contaminated gas generating unit is shut down for repair, reconfiguration or reloading. During such periods of interruption it is impractical to shut down the scrubbing unit. However, without positive flow of effluent in inlet 22, water vapor or the like from the scrubbing liquid in chamber 20 may enter inlet 22 and tubular member 129. Without the flow of effluent through member 129, such vapors may collect and condense in the inlet 22 and adjacent portions of tubular member 129. To avoid such accumulations of condensate, all of tubular member 129 which is subject to backflow of scrubbing liquid vapor should be elevated to at least the level of the lowest inlet edge of inlet 22. This assures that condensate cannot pool in tubular member 129. Alternatively (or in conjunction therewith) the portion of tubular member 129 adjacent inlet 22 which is subject to backflow of scrubbing liquid vapor may be heated by means such as heater 40 to maintain the temperature thereof equal to or above a minimum temperature which is, of course, the temperature at which the scrubbing liquid will not condense in tubular member 129. This temperature is ordinarily the boiling point or vaporization point for the scrubbing liquid. Where the scrubbing liquid is primarily water and the effluent contains silanes, the portion of tubular member 129 adjacent inlet 22 is preferably maintained at or above 100° C. so that water cannot condense on the walls of tubular member 129 and react with incoming effluent.

Heater 40 may be a simple resistance wire coiled about the tubular member which is heated by passing electrical current therethrough. Other heating means, such as forced air or circulated fluid heaters and the like are equally suitable.

From the foregoing it will be observed that the principles of the invention may be employed in various embodiments to mix scrubbing liquid with a gas to remove contaminants from the gas. The invention is uniquely suitable for implementation in relatively small self-contained units and, because it does not appreciably affect the flow rate or pressure of gas flowing therethrough, may be positioned at any of various positions within a gas collection system and be essentially transparent to the collection system in terms of pressure and flow rate. Because of these unique characteristics, such units may be staged in series, parallel or used individually between the outlet of a contaminated gas generating unit and a gas collection system to effectively and efficiently remove contaminating gas and/or suspended particles from the effluent gas stream.

While the invention has been described with specific reference to particular embodiments thereof, it is to be understood that the embodiments shown and described are illustrative only. Various changes and modifications may be resorted to without departing from the spirit and scope of the invention as defined by the appended claims.

What is claimed:

1. The method of mixing scrubbing liquid with gas flowing through a conduit system and removing the scrubbing liquid from the gas without appreciably affecting the pressure or flow rate of gas through such system comprising the steps of:

(a) mounting a mixing member having a first scrubbing surface and an oppositely disposed second scrubbing surface for rotation about its axis in a chamber;

(b) directing gas from a conduit system through an inlet into said chamber near the axis of said mixing member and said first scrubbing surface;

(c) withdrawing gas from said chamber through an outlet near the axis of said mixing member and said second scrubbing surface;

(d) injecting scrubbing liquid into said chamber and directing said scrubbing liquid toward said first scrubbing surface;

(e) causing said gas and said scrubbing liquid to flow radially along said first scrubbing surface in the radial direction from said axis toward the periphery of said mixing member;

(f) injecting scrubbing liquid into said chamber and directing said scrubbing liquid toward said second scrubbing surface;

(g) causing said scrubbing liquid to flow radially along said second scrubbing surface in the radial direction from said axis toward the periphery of said mixing member while causing said gas to flow radially in the radial direction from the periphery of said mixing member toward said axis;

(h) collecting said scrubbing liquid near the periphery of said mixing member and withdrawing said scrubbing liquid from said chamber; and (i) heating the inlet and the conduit adjacent thereto to maintain the temperature thereof above a predetermined minimum temperature.

2. The method of mixing scrubbing liquid with gas flowing through a conduit system and removing the scrubbing liquid from the gas without appreciably affecting the pressure or flow rate of gas through such system comprising the steps of:

(a) mounting a mixing member having a first scrubbing surface and an oppositely disposed second scrubbing surface for rotation about its axis in a chamber;

(b) directing gas from a conduit system through an inlet into said chamber near the axis of said mixing member and said first scrubbing surface;

(c) withdrawing gas from said chamber through an outlet near the axis of said mixing member and said second scrubbing surface;

(d) injecting scrubbing liquid into said chamber and directing said scrubbing liquid toward said first scrubbing surface;

(e) causing said gas and said scrubbing liquid to flow radially along said first scrubbing surface in the radial direction from said axis toward the periphery of said mixing member;

(f) injecting scrubbing liquid into said chamber and directing said scrubbing liquid toward said second scrubbing surface;

(g) causing said scrubbing liquid to flow radially along said second scrubbing surface in the radial direction from said axis toward the periphery of said mixing member while causing said gas to flow radially in the radial direction from the periphery of said mixing member toward said axis;

(h) collecting said scrubbing liquid near the periphery of said mixing member and withdrawing said scrubbing liquid from said chamber; and (i) mounting an agitator on said mixing member which extends into said inlet so that rotation of said mixing member causes rotation of said agitator in said inlet to prevent accumulation of precipitate therein.

3. The method of mixing scrubbing liquid with gas flowing through a conduit system and removing the scrubbing liquid from the gas without appreciably affecting the pressure or flow rate of gas through such system comprising the steps of:

(a) mounting a mixing member having a first scrubbing surface and an oppositely disposed second scrubbing surface for rotation about its axis in a chamber;

(b) directing gas from a conduit system through an inlet into said chamber near the axis of said mixing member and said first scrubbing surface;

(c) withdrawing gas from said chamber through an outlet near the axis of said mixing member and said second scrubbing surface;

(d) injecting scrubbing liquid into said chamber and directing said scrubbing liquid toward said first scrubbing surface;

(e) causing said gas and said scrubbing liquid to flow radially along said first scrubbing surface in the radial direction from said axis toward the periphery of said mixing member;

(f) injecting scrubbing liquid into said chamber and directing said scrubbing liquid toward said second scrubbing surface;

(g) causing said scrubbing liquid to flow radially along said second scrubbing surface in the radial direction from said axis toward the periphery of said mixing member while causing said gas to flow radially in the radial direction from the periphery of said mixing member toward said axis;

(h) collecting said scrubbing liquid near the periphery of said mixing member and withdrawing said scrubbing liquid from said chamber; and (i) heating the conduit adjacent said inlet into said chamber to prevent formation or accumulation of condensates in or near said inlet.

4. The method of mixing scrubbing liquid with gas flowing through a conduit system and removing the scrubbing liquid from the gas without appreciably affecting the pressure or flow rate of gas through such system comprising the steps of:

(a) mounting a mixing member having a first scrubbing surface and an oppositely disposed second scrubbing surface for rotation about its axis in a chamber;

(b) directing gas from a conduit system through an inlet into said chamber near the axis of said mixing member and said first scrubbing surface;

(c) withdrawing gas from said chamber through an outlet near the axis of said mixing member and said second scrubbing surface;

(d) injecting scrubbing liquid into said chamber and directing said scrubbing liquid toward said first scrubbing surface;

(e) causing said gas and said scrubbing liquid to flow radially along said first scrubbing surface in the radial direction from said axis toward the periphery of said mixing member;

(f) injecting scrubbing liquid into said chamber and directing said scrubbing liquid toward said second scrubbing surface;

(g) causing said scrubbing liquid to flow radially along said second scrubbing surface in the radial direction from said axis toward the periphery of said mixing member while causing said gas to flow radially in the radial direction from the periphery of said mixing member toward said axis;

(h) collecting said scrubbing liquid near the periphery of said mixing member and withdrawing said scrubbing liquid from said chamber; and (i) rotating an agitator in said inlet into said chamber to prevent accumulation of precipitates in or near said inlet.

5. Apparatus for mixing scrubbing liquid with gas flowing through a conduit system and removing the scrubbing liquid from the gas without appreciably affecting the pressure or flow rate of gas flowing through such system comprising:

(a) a chamber for receiving gas flowing through a conduit system;

(b) a mixing member having oppositely disposed first and second scrubbing surfaces mounted in said chamber for rotation about its axis;

(c) inlets for directing scrubbing liquid toward said first and second scrubbing surfaces;

(d) a tubular member terminating in a gas inlet for directing gas from said conduit system into said chamber near said axis and said first scrubbing surface;

(e) a gas outlet for withdrawing gas from said chamber near said axis and said second scrubbing surface;

(f) an outlet for collecting scrubbing liquid near the outer periphery of said rotating member and withdrawing said scrubbing liquid from said chamber;

(g) surface variations in said first scrubbing surface which cause turbulence and agitation of gas and scrubbing liquid in said chamber and effect or permit flow or effect and permit flow of gas and scrubbing liquid along said scrubbing surface in the outward direction from the axis of said mixing member toward the periphery thereof;

(h) surface variations in said second surface which cause turbulence and agitation of gas and scrubbing liquid in said chamber and effect or permit flow or effect and permit flow of scrubbing liquid along said second scrubbing surface in the outward direction from the axis of said mixing member toward the periphery thereof and countercurrent flow of gas in the inward direction from the periphery of the mixing member toward the axis thereof; and (i) a heater for maintaining the temperature of said tubular member adjacent said gas inlet at or above a preselected minimum temperature.

6. Apparatus for mixing scrubbing liquid with gas flowing through a conduit system and removing the scrubbing liquid from the gas without appreciably affecting the pressure or flow rate of gas flowing through such system comprising:

(a) a chamber for receiving gas flowing through a conduit system;

(b) a mixing member having oppositely disposed first and second scrubbing surfaces mounted in said chamber for rotation about its axis;

(c) inlets for directing scrubbing liquid toward said first and second scrubbing surfaces;

(d) a tubular member terminating in a gas inlet for directing gas from said conduit system into said chamber near said axis and said first scrubbing surface;

(e) a gas outlet for withdrawing gas from said chamber near said axis and said second scrubbing surface;

(f) an outlet for collecting scrubbing liquid near the outer periphery of said rotating member and withdrawing said scrubbing liquid from said chamber;

(g) surface variations in said first scrubbing surface which cause turbulence and agitation of gas and scrubbing liquid in said chamber and effect or permit flow or effect and permit flow of gas and scrubbing liquid along said scrubbing surface in the outward direction from the axis of said mixing member toward the periphery thereof;

(h) surface variations in said second surface which cause turbulence and agitation of gas and scrubbing liquid in said chamber and effect or permit flow or effect and permit flow of scrubbing liquid along said second scrubbing surface in the outward direction from the axis of said mixing member toward the periphery thereof and countercurrent flow of gas in the inward direction from the periphery of the mixing member toward the axis thereof; and (i) an agitator extending from said mixing member substantially parallel with the axis thereof and into said gas inlet which rotates within said gas inlet to prevent collection or formation of precipitates in or near said gas inlet.

7. Apparatus as defined in claim 6 wherein said agitator comprises a pair of rods extending from said mixing member into said gas inlet and which scrape the inner surfaces of said gas inlet or the tubular member adjacent thereto or the inner surfaces of said gas inlet and the tubular member adjacent thereto to prevent collection or formation of precipitates in or near said gas inlet.

8. Apparatus for mixing scrubbing liquid with gas flowing through a conduit system and removing the scrubbing liquid from the gas without appreciably affecting the pressure or flow rate of gas flowing through such system comprising:

(a) a chamber for receiving gas flowing through a conduit system;

(b) a mixing member having oppositely disposed first and second scrubbing surfaces mounted in said chamber for rotation about its axis;

(c) inlets for directing scrubbing liquid toward said first and second scrubbing surfaces;

(d) a tubular member terminating in a gas inlet for directing gas from said conduit system into said chamber near said axis and said first scrubbing surface;

(e) a gas outlet for withdrawing gas from said chamber near said axis and said second scrubbing surface;

(f) an outlet for collecting scrubbing liquid near the outer periphery of said rotating member and withdrawing said scrubbing liquid from said chamber;

(g) surface variations in said first scrubbing surface which cause turbulence and agitation of gas and scrubbing liquid in said chamber and effect or permit flow or effect and permit flow of gas and scrubbing liquid along said scrubbing surface in the outward direction from the axis of said mixing member toward the periphery thereof;

(h) surface variations in said second surface which cause turbulence and agitation of gas and scrubbing liquid in said chamber and effect or permit flow or effect and permit flow of scrubbing liquid along said second scrubbing surface in the outward direction from the axis of said mixing member toward the periphery thereof and countercurrent flow of gas in the inward direction from the periphery of the mixing member toward the axis thereof; and (i) means for preventing formation or accumulation of precipitates or condensates in said gas inlet or said tubular member.

9. Apparatus for mixing scrubbing liquid with gas flowing through a conduit system and removing the scrubbing liquid from the gas without appreciably affecting the pressure or flow rate of gas flowing through such system comprising:

(a) a chamber for receiving gas flowing through a conduit system;

(b) a rotatable wheel housed in said chamber having a first scrubbing surface and an oppositely disposed second scrubbing surface;

(c) drive means for rotating said rotatable wheel about an axis;

(d) a gas inlet in said chamber connected to a tubular member for directing gas from said conduit system toward said first scrubbing surface near the axis of said rotatable wheel;

(e) a liquid inlet in said chamber adapted to inject scrubbing liquid into said chamber;

(f) a plurality of first scrubbing vanes extending from said first scrubbing surface which increase in height as they extend from the axis toward the periphery of said rotatable wheel to create turbulence which facilitates surface contact between gas and scrubbing liquid in said chamber for mass transfer of solubles from the gas to the scrubbing liquid and to move gas and scrubbing liquid radially outwardly across said first scrubbing surface toward the periphery of the wheel;

(g) a gas outlet integral with said chamber for returning scrubbed gas to said conduit system;

(h) an outlet for collecting scrubbing liquid near the periphery of said wheel and draining such scrubbing liquid from said chamber; and (i) a heater which maintains the temperature of said gas inlet and the portion of said tubular member adjacent thereto above a predetermined minimum temperature.

10. Apparatus for mixing scrubbing liquid with gas flowing through a conduit system and removing the scrubbing liquid from the gas without appreciably affecting the pressure or flow rate of gas flowing through such system comprising:

(a) a chamber for receiving gas flowing through a conduit system;

(b) a rotatable wheel housed in said chamber having a first scrubbing surface and an oppositely disposed second scrubbing surface;

(c) drive means for rotating said rotatable wheel about an axis;

(d) a gas inlet in said chamber connected to a tubular member for directing gas from said conduit system toward said first scrubbing surface near the axis of said rotatable wheel;

(e) a liquid inlet in said chamber adapted to inject scrubbing liquid into said chamber;

(f) a plurality of first scrubbing vanes extending from said first scrubbing surface which increase in height as they extend from the axis toward the periphery of said rotatable wheel to create turbulence which facilitates surface contact between gas and scrubbing liquid in said chamber for mass transfer of solubles from the gas to the scrubbing liquid and to move gas and scrubbing liquid radially outwardly across said first scrubbing surface toward the periphery of the wheel;

(g) a gas outlet integral with said chamber for returning scrubbed gas to said conduit system;

(h) an outlet for collecting scrubbing liquid near the periphery of said wheel and draining such scrubbing liquid from said chamber; and (i) an agitator extending from said rotatable wheel into said gas inlet and which rotates with said rotatable wheel to maintain said gas inlet relatively free of precipitate.

11. Apparatus as defined in claim 10 wherein said agitator comprises a pair of rods extending from said wheel substantially parallel with the axis thereof which scrape the inner surface of said inlet and the tubular member adjacent thereto when said wheel rotates.

12. Apparatus for mixing scrubbing liquid with gas flowing through a conduit system and removing the scrubbing liquid from the gas without appreciably affecting the pressure or flow rate of gas flowing through such system comprising:

(a) a chamber for receiving gas flowing through a conduit system;

(b) a rotatable wheel housed in said chamber having a first scrubbing surface and an oppositely disposed second scrubbing surface;

(c) drive means for rotating said rotatable wheel about an axis;

(d) a gas inlet in said chamber connected to a tubular member for directing gas from said conduit system toward said first scrubbing surface near the axis of said rotatable wheel;

(e) a liquid inlet in said chamber adapted to inject scrubbing liquid into said chamber;

(f) a plurality of first scrubbing vanes extending from said first scrubbing surface which increase in height as they extend from the axis toward the periphery of said rotatable wheel to create turbulence which facilitates surface contact between gas and scrubbing liquid in said chamber for mass transfer of solubles from the gas to the scrubbing liquid and to move gas and scrubbing liquid radially outwardly across said first scrubbing surface toward the periphery of the wheel;

(g) a gas outlet integral with said chamber for returning scrubbed gas to said conduit system;

(h) an outlet for collecting scrubbing liquid near the periphery of said wheel and draining such scrubbing liquid from said chamber; and (i) means for preventing formation or accumulation of condensates or precipitates in said gas inlet or said tubular member.

* * * * *